United States Patent
Oh et al.

(10) Patent No.: US 8,988,856 B2
(45) Date of Patent: Mar. 24, 2015

(54) MULTI LAYER CERAMIC CAPACITOR

(71) Applicant: Samhwa Capacitor Co., Ltd., Yongin-si (KR)

(72) Inventors: Young Joo Oh, Seoul (KR); Jung Rag Yoon, Yongin-si (KR); Kyung Min Lee, Paju-si (KR); Jae Min Kim, Osan-si (KR)

(73) Assignee: Samhwa Capacitor Co., Ltd. (KR)

( * ) Notice: Subject to any disclaimer, the term of this patent is extended or adjusted under 35 U.S.C. 154(b) by 190 days.

(21) Appl. No.: 13/718,228

(22) Filed: Dec. 18, 2012

(65) Prior Publication Data

US 2013/0170095 A1    Jul. 4, 2013

(30) Foreign Application Priority Data

Dec. 29, 2011 (KR) .................. 10-2011-0145638

(51) Int. Cl.
| | |
|---|---|
| H01G 4/228 | (2006.01) |
| H01G 4/30 | (2006.01) |
| H01G 4/008 | (2006.01) |
| H01G 4/232 | (2006.01) |

(52) U.S. Cl.
CPC ............. H01G 4/008 (2013.01); H01G 4/30 (2013.01); H01G 4/2325 (2013.01)
USPC .................................... 361/306.3; 361/301.4

(58) Field of Classification Search
USPC ................................ 361/306.1, 306.3, 301.4
See application file for complete search history.

(56) References Cited

U.S. PATENT DOCUMENTS

| | | | |
|---|---|---|---|
| 5,335,139 A | 8/1994 | Monura et al. | |
| 8,687,345 B2 * | 4/2014 | Higashi et al. | 361/306.3 |
| 2009/0052114 A1 * | 2/2009 | Motoki et al. | 361/306.3 |
| 2010/0067170 A1 * | 3/2010 | Koga | 361/306.3 |

* cited by examiner

Primary Examiner — Eric Thomas
(74) Attorney, Agent, or Firm — Cantor Colburn LLP

(57) ABSTRACT

Provided is a multilayer ceramic capacitor including a multilayer ceramic plastic body formed so that a plurality of internal electrode layers intersects; and a plurality of external electrodes, each formed to cover one side or another side of the multilayer ceramic plastic body and connected to the plurality of internal electrode layers. Each of the plurality of external electrodes includes a plurality of conductive layers that is sequentially formed to cover one side or another side of the multilayer ceramic plastic body, and one of the plurality of conductive layers is formed of conductive resin hardened through an irradiation cross-linking method using gamma ray.

10 Claims, 5 Drawing Sheets

| Amount of irradiation (Mrad) | Reflow 280°C/10 sec | Thermal shock -55~+150°C /500 times | Environment test | |
|---|---|---|---|---|
| | | | 85°C 85% RH/1000 hours | 85°C 85% RH/5000 hours |
| 0 | 0 | 238 | 1000 | 1000 |
| 3 | 0 | 162 | 379 | 863 |
| 5 | 0 | 42 | 26 | 432 |
| 8 | 0 | 3 | 4 | 74 |
| 10 | 0 | 0 | 1 | 2 |
| 12 | 0 | 0 | 0 | 1 |
| 14 | 0 | 0 | 0 | 0 |
| 16 | 0 | 0 | 0 | 0 |
| 18 | 0 | 0 | 0 | 0 |
| 20 | 0 | 0 | 0 | 0 |

MULTI LAYER CERAMIC CAPACITOR

CROSS-REFERENCE TO RELATED APPLICATION

This application claims the benefit of Korean Patent Application No. 10-2011-00145638, filed on Dec. 29, 2011, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor that may uniformly harden conductive resin by hardening the conductive resin through an irradiation cross-linking method using gamma ray.

2. Description of the Related Art

A multilayer ceramic capacitor includes a ceramic plastic body formed so that a plurality of internal electrode layers may be alternately disposed, and an external electrode formed in each of both ends of the ceramic plastic body and including a plurality of conductive layers. The multilayer ceramic capacitor is mounted to a printed circuit board using a surface mounting method. Due to the above mounting structure, when an external force is applied or when the printed circuit board is bent, stress may be transferred to the multilayer ceramic capacitor by the external force or bending through a soldering portion.

When the stress is applied to the multilayer ceramic capacitor, the ceramic plastic body and the external electrode may be separate from each other due to the stress or crevice may occur in the ceramic plastic body. Accordingly, a short phenomenon that the internal electrode layers are electrically connected to each other may occur. As technology for preventing the above short phenomenon, technology of forming a conductive body (hereinafter, referred to as conductive resin) including resin as a buffering material on a conductive layer connected to the plurality of internal electrode layers among the plurality of conductive layers is being developed.

In the case of the conventional multilayer ceramic capacitor, thermosetting resin is included in conductive resin. The thermosetting resin is hardened through heat treatment in a temperature of 150 degrees to 300 degrees for 10 hours to 24 hours and thereby is prepared. The conductive resin acts as a buffering material to absorb the stress that is applied to the multilayer ceramic capacitor and thereby decrease the stress against the external electrode. Accordingly, the conductive resin may prevent the occurrence of the short phenomenon that the ceramic plastic body and the external electrode are separate from each other due to the stress or crevice occurs in the ceramic plastic body whereby the internal electrode layers are electrically connected to each other.

As described above, conductive resin used for the external electrode of the conventional multilayer ceramic capacitor is hardened using a thermosetting method. Accordingly, when heat is unevenly transferred to the conductive resin during a hardening process, an insulating film is formed on an interface of the conductive resin to thereby degrade an electrical characteristic of the multilayer ceramic capacitor. Also, in the case of the conventional conductive resin, foreign substance may occur as a by-product during a thermosetting process. When the foreign substance is adhered to the external electrode, fault may occur in the appearance of the external electrode, thereby degrading the productivity of the multilayer ceramic capacitor.

SUMMARY OF THE INVENTION

An aspect of the present invention provides a multilayer ceramic capacitor that may uniformly harden conductive resin by hardening the conductive resin through an irradiation cross-linking method using gamma ray.

Another aspect of the present invention also provides a multilayer ceramic capacitor that may enhance the degree of crystallization of conductive resin by uniformly hardening the conductive resin through an irradiation cross-linking method using gamma ray, and may prevent an electrical characteristic from being degraded due to thermosetting.

Another aspect of the present invention also provides a multilayer ceramic capacitor that may enhance the productivity of a multilayer ceramic capacitor by preventing fault from occurring in the appearance of an external electrode due to a foreign substance that occurs during a hardening process of hardening conductive resin through an irradiation cross-linking method using gamma ray.

According to an aspect of the present invention, there is provided a multilayer ceramic capacitor, including: a multilayer ceramic plastic body formed so that a plurality of internal electrode layers intersects; and a plurality of external electrodes, each formed to cover one side or another side of the multilayer ceramic plastic body and connected to the plurality of internal electrode layers. Each of the plurality of external electrodes includes a plurality of conductive layers that is sequentially formed to cover one side or another side of the multilayer ceramic plastic body, and one of the plurality of conductive layers is formed of conductive resin hardened through an irradiation cross-linking method using gamma ray.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE INVENTION

Figure 1:
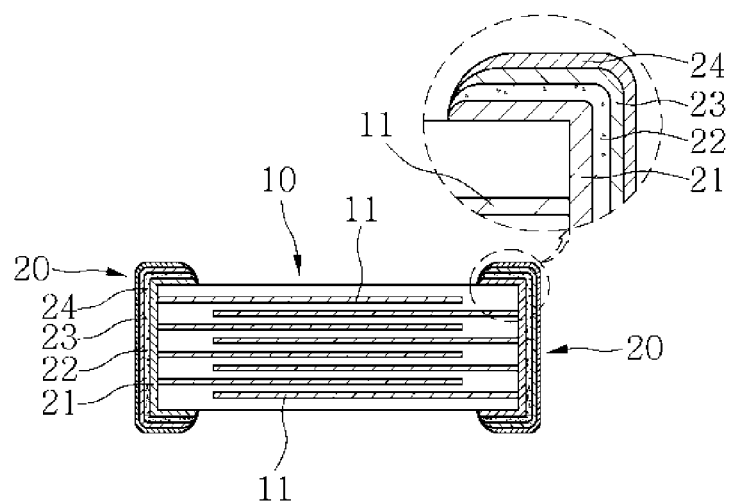
FIG. 1 is a cross-sectional view of a multilayer ceramic capacitor according to a first embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of a multilayer ceramic capacitor of the present invention will be described.

As illustrated in FIG. 1, a multilayer ceramic capacitor according to a first embodiment of the present invention includes a multilayer ceramic plastic body 10 and a plurality of external electrodes 20.

The multilayer ceramic plastic body 10 is formed so that a plurality of internal electrode layers 11 may intersect. Each of the plurality of external electrodes 20 is formed to cover one side or another side of the multilayer ceramic plastic body 10 and thereby is electrically connected to the plurality of internal electrode layers 11. Each of the plurality of external electrodes 20 includes a plurality of conductive layers The plurality of conductive layers is sequentially disposed to cover the one side or the other side of the multilayer ceramic plastic body 10, and includes a first conductive layer 21, a second conductive layer 22, a third conductive layer 23, and a fourth conductive layer 24. One of the plurality of conductive layers 21, 22, 23, and 24 includes conductive resin hardened through an irradiation cross-linking method using gamma ray.

Among the plurality of conductive layers 21, 22, 23, and 24 constituting the external electrode 20, the first conductive layer 21 is formed to cover a circumferential surface 10a or a cross section 10b of the one side or the other side of the multilayer ceramic plastic body 10 and thereby is connected to the plurality of internal electrode layers 11. That is, the first conductive layer 21 is formed to cover the circumferential surface 10a and the cross section 10b of the one side or the other side of the multilayer ceramic plastic body 10 of FIG. 9, and is formed to contact with the internal electrode layer 11 that is formed to be exposed from the cross section 10b and thereby be connected to the internal electrode layer 11.

The second conductive layer 22 is disposed on the first conductive layer 21 to cover the first conductive layer 21, and includes conductive resin hardened through the irradiation cross-linking method using gamma ray and thereby functions to buffer stress that is transferred from an outside to the multilayer ceramic capacitor. The conductive resin uses gamma ray that is irradiated at 10 Mrad to 20 Mrad. A material of the conductive resin includes a conductive agent of 70 wt % to 90 wt %, resin of 9 wt % to 27 wt %, an irradiation cross-linking agent of 0.3 wt % to 1 wt %, and a metal chain agent of 1 wt % to 3 wt %. Among materials of the conductive resin, one of or a mixture of at least one of Cu, Ni, Sn, Ag, and Al is selected and thereby used for the conductive agent, and one of or a mixture of at least two of epoxy, polyimide, polytetrafluoroethylene (PTFE), and phenol is selected and thereby used for the resin. One of polyethylene terephthalate (PET) and poly sulfone (PSF) is selected and thereby used for the irradiation cross-linking agent, and one of carbon nano tube and carbon black is used for the metal chain agent.

By performing irradiation cross-link using gamma ray with respect to the conductive resin constituting the second conductive layer 22, relative cross-linking of the conductive resin may increase while a photon with high energy passes through the conductive resin. Accordingly, the degree of crystallization may increase. According to the increase in the degree of crystallization, the conductive resin functions as a buffer against the stress that occurs due to heat or shock transferred from an outside. Accordingly, the reliability of an electrical or mechanical characteristic of the multilayer ceramic capacitor of the present invention may be enhanced.

The third conductive layer 23 is disposed on the second conductive layer 22 to cover the second conductive layer 22, and the fourth conductive layer 24 is disposed on the third conductive layer 23 to cover the third conductive layer 23.

While the conductive resin is used for the second conductive layer 22, one of Ag, Ag—Pt (Ag—Pt mixture), Cu, Ni, and Sn is selected and thereby used for a material of each of the first conductive layer 21, the third conductive layer 23, and the fourth conductive layer 24. For example, cupper (Cu) may be used for the first conductive layer 21, nickel (Ni) may be used for the third conductive layer 23, and tin (Sn) may be used for the fourth conductive layer 24.

Figure 4:
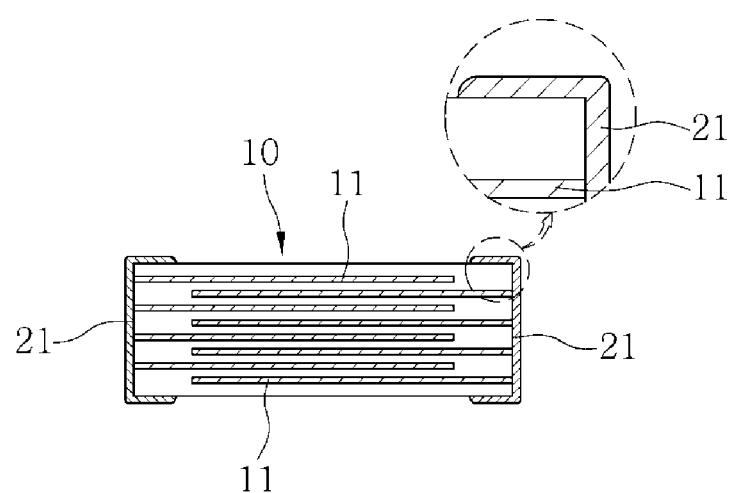
FIGS. 4 through 9 are views to describe a manufacturing process of a multilayer ceramic capacitor of the present invention.
Figure 5:
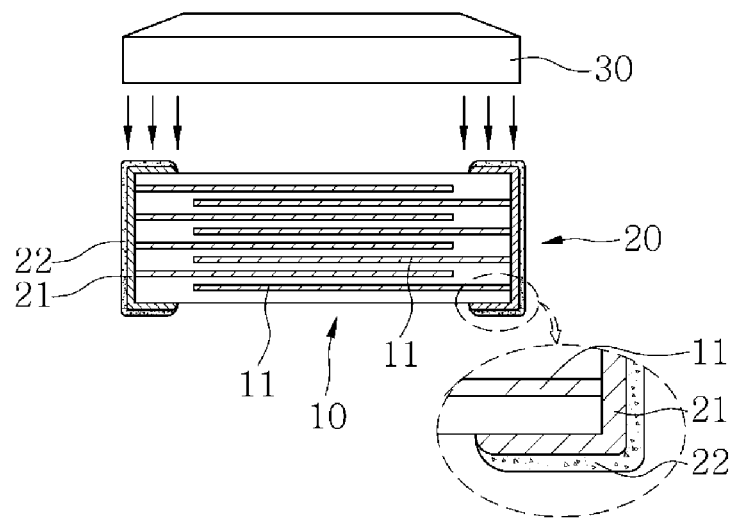

Hereinafter, a manufacturing method of the multilayer ceramic capacitor having the above configuration according to the first embodiment of the present invention will be described with reference to FIGS. 4, 5, and 9.

Initially, the multilayer ceramic plastic body 10 is manufactured. The multilayer ceramic plastic body 10 disposes a plurality of dielectric ceramic green sheets (not shown), each in which the internal electrode layer 11 is formed in an upper portion. When the plurality of dielectric green sheets is disposed, a green sheet multilayered body (not shown) is formed by compressing the plurality of dielectric ceramic green sheets at the pressure of 400 kgf/cm2 to 1600 kgf/cm2 and then is burned out for 20 hours to 50 hours in a temperature of 250 degrees to 300 degrees. When the burning out is completed, the green sheet multilayered body is sintered for 0.3 hour to 5 hours in a temperature of 1100 degrees to 1350 degrees. Through the above process, the multilayer ceramic plastic body 10 is manufactured.

When the multilayer ceramic plastic body 10 is manufactured, the external electrode 20 is formed on each of one side and the other side of the multilayer ceramic plastic body 10. As illustrated in FIG. 4, in the external electrode 20, the first conductive layer 21 is formed by forming Ag, Ag—Pt, or Cu using a dipping method, a printing method, or a metal depositing method to cover the circumferential surface 10a and the cross section 10a of the one side or the other side of the multilayer ceramic plastic body 10. Here, as illustrated in FIG. 9, the circumferential surface 10a of the one side or the other side of the multilayer ceramic plastic body 10 indicates a peripheral surface of an edge portion of the one side or the other side of the multilayer ceramic plastic body 10. FIG. 9 is a perspective view of the multilayer ceramic capacitor 10.

When the first conductive layer 21 is formed, conductive resin is prepared to be in a paste state. Next, as illustrated in FIG. 5, the second conductive layer 22 is formed by applying the paste to cover the first conductive layer 21 using a silk printing method, a spraying method, and a dipping method. When the second conductive layer 22 is formed, the paste is dried through heat treatment and gamma ray is irradiated toward the second conductive layer 22 using a gamma ray irradiating apparatus 30. The conductive resin constituting the second conductive layer 22 toward which the gamma ray is irradiated may form a bridging structure, thereby enhancing the degree of crystallization and a heat-resistant characteristic.

When the second conductive layer 22 is formed, the third conductive layer 23 is formed by applying Ni to cover the second conductive layer 22 using a plating method. When the third conductive layer 23 is formed, the fourth conductive layer 24 is formed by applying Sn to cover the third conductive layer 23 using a plating method. Through the above process, the external electrode 20 is formed.

Figure 2:
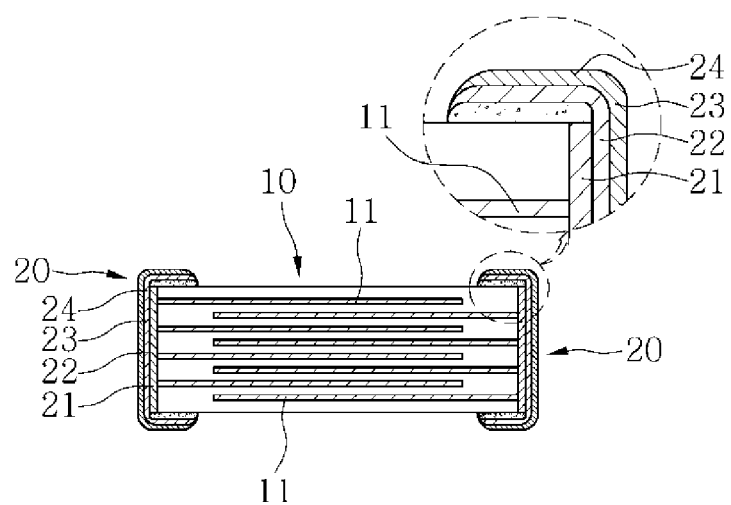
FIG. 2 is a cross-sectional view of a multilayer ceramic capacitor according to a second embodiment of the present invention.
Figure 7:
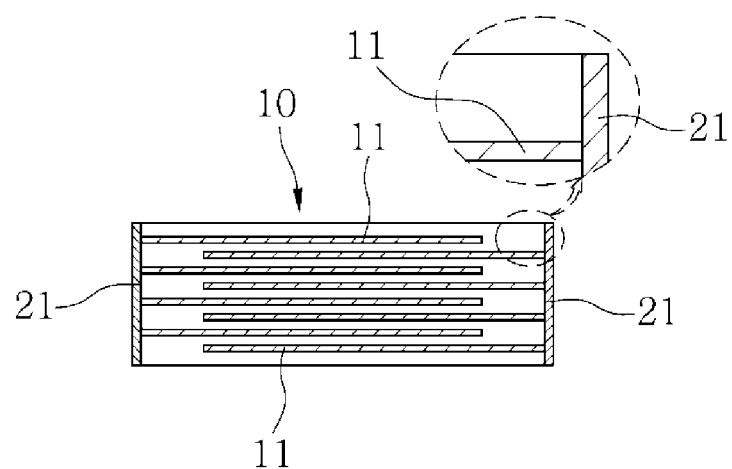
Figure 8:
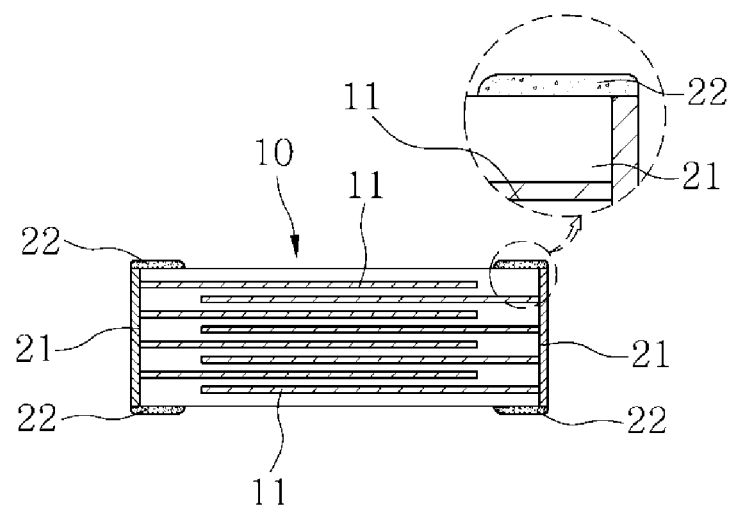

Another embodiment of the external electrode 20 is illustrated in FIG. 2. FIG. 2 illustrates the multilayer ceramic capacitor according to a second embodiment of the present invention. As illustrated in FIGS. 2 and 7, the first conductive layer 21 is formed on the cross section 10b of the one side or the other side of the multilayer ceramic plastic body 10. When the first conductive layer 21 is formed, the second conductive layer 22 is formed on the edge of the first conductive layer 21 and the circumferential surface 10a of the one side or the other side of the multilayer ceramic plastic body 10. Conductive resin is applied to the second conductive layer 22, which is the same as in the first embodiment of the present invention. The conductive resin is hardened through an irradiation cross-linking method using gamma ray.

Figure 3:
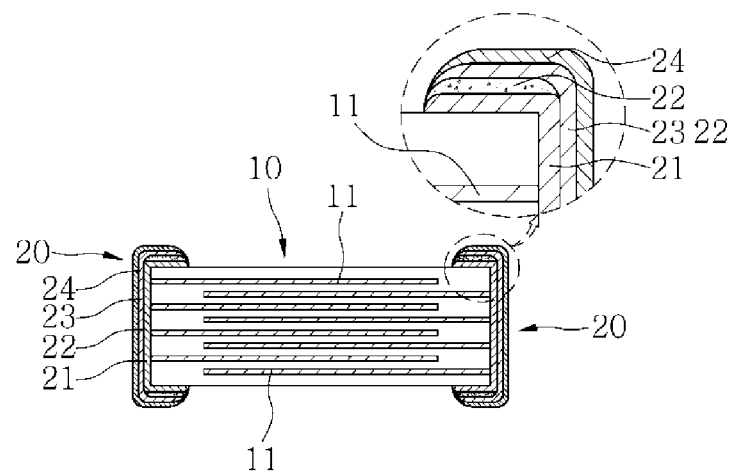
FIG. 3 is a cross-sectional view of a multilayer ceramic capacitor according to a third embodiment of the present invention.
Figure 6:
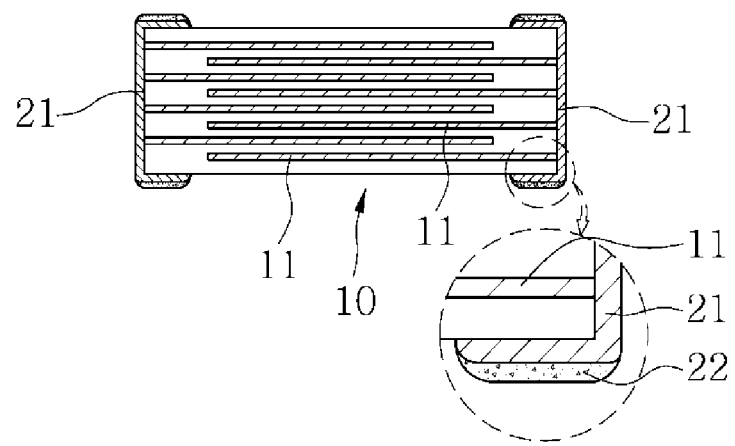

Even when forming the second conductive layer 22 on the edge of the first conductive layer 21 and the circumferential surface 10a of the one side or the other side of the multilayer ceramic plastic body 10, thermal stress or stress may be concentrated on an edge portion of the multilayer ceramic plastic body 10 through the external electrode 20. Accordingly, the conductive resin may perform a buffering functionality. By reducing an amount of usage of an expensive metal agent such as silver (Ag) used for manufacturing the second conductive layer 22, it is possible to reduce a production cost. When hardening of the second conductive layer 22 is completed, the third conductive layer 23 is formed. Here, the third conductive layer 23 is formed to cover the first conductive layer 21 and the second conductive layer 22. When the third conductive layer 23 is formed, the fourth conductive layer 24 is formed to cover the third conductive layer 23. Through the above process, the external electrode 20 is formed Still another embodiment of the external electrode 20 is illustrated in FIG. 3 and FIG. 6. FIG. 3 and FIG. 6 illustrate the multilayer ceramic capacitor according to a third embodiment of the present invention. Referring to FIG. 3, when the first conductive layer 21 is formed to cover the circumferential surface 10a and the cross section 10b of the one side or the other side of the multilayer ceramic plastic body 10, the second conductive layer 22 is formed. The second conductive layer 22 is formed along the circumferential surface of the first conductive layer 21. That is, the second conductive layer 22 is formed in an upper area of the first conductive layer 21 that is formed on the circumferential surface 10a of the one side or the other side of the multilayer ceramic plastic body 10. Conductive resin hardened using gamma ray is applied to the second conductive layer 22.

Even when forming the second conductive layer 22 only on a top of the first conductive layer 21, thermal stress or stress may be concentrated on an edge portion of the multilayer ceramic plastic body 10 through the external electrode 20. Accordingly, the conductive resin may perform a buffering functionality. By forming the second conductive layer 22 only on the top of the first conductive layer 21, an amount of usage of an expensive metal agent such as Ag may be reduced. Therefore, it is possible to reduce a production cost of the second conductive layer 22. When the second conductive layer 22 is formed, the third conductive layer 23 is formed. The third conductive layer 23 is formed to cover the first conductive layer 21 and the second conductive layer 22. When the third conductive layer 23 is formed, the fourth conductive layer 24 is e formed to cover the third conductive layer 23. Through the above process, the external electrode 20 is formed.

The reliability of the multilayer ceramic capacitor of the present invention constructed as above has been tested. For the test, test samples of the multilayer ceramic capacitor of FIG. 1 were prepared so that the conductive resin of the second conductive layer 22 may include Ag 75 wt %, epoxy 17 wt %+PTFE 5 wt %, carbon black (CB) 2 wt %, and PET 1 wt %. A thermal shock and high temperature and high humidity environment test was implemented after irradiating gamma ray toward the prepared test samples.

The multilayer ceramic capacitor toward which gamma ray was irradiated at 0 Mrad to 8 Mrad had no fault at a reflow test (280 degrees/10 seconds). However, after the reflow test, that is, at a high temperature and high humidity environment test (85 degrees/85%/RH/1000 hours, and 85 degrees/85%/RH/5000 hours), and a thermal shock test (−55 degrees to +150 degrees/500 times), the number of faulty products increased. That is, it can be known that the number of faulty products increases according to a decrease in an amount of illumination of gamma ray.

In a case in which high temperature and high humidity is maintained for long hours, and in the case of the multilayer ceramic capacitor toward which the gamma ray is not irradiated, 1000 faulty products occurred in both primary and secondary high temperature and high humidity environment tests (85 degrees/85%/RH/1000 hours and 85 degrees/85%/RH/5000 hours). In the case of the multilayer ceramic capacitor toward which the gamma ray is irradiated at 3 Mrad, 379 faulty products occurred in the primary high temperature and high humidity environment test (85 degrees/85%/RH/1000 hours) and 863 faulty products occurred in the secondary high temperature and high humidity environment test (85 degrees/85%/RH/5000 hours). That is, a fault occurrence rate has increased according to an increase in an amount of time. Also, in the thermal shock test (−55 degrees to +150 degrees/500 times), as the amount of irradiation of gamma ray decreased from "8 Mrad" to "0", the fault occurrence rate increased from "3" to "238. Here, a test about the fault occurrence is implemented using a scanning acoustic tomography (hereinafter, "SAT") after measuring a change rate of loss and capacity using a bending test.

Figures 9, 10:
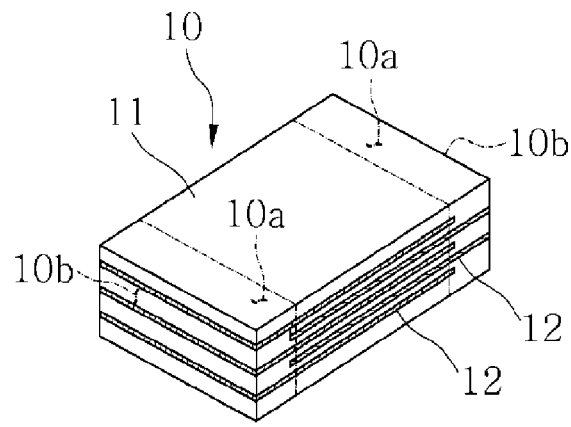
FIG. 10 is a table showing a reliability test result of a multilayer ceramic capacitor of the present invention.

As illustrated in FIG. 10, in the case of the multilayer ceramic capacitor to which gamma ray was irradiated at 10 Mrad to 20 Mrad, a faulty product did not occur in the thermal shock test that was performed after the reflow test (280 degrees/10 second) and a fault occurrence rate was significantly decreased in high temperature and high humidity environment tests (85 degrees/85%/RH/1000 hours and 85 degrees/85%/RH/5000 hours).

As described above, the multilayer ceramic capacitor of the present invention may uniformly harden conductive resin through an irradiation cross-linking method using gamma ray, thereby enhancing the degree of crystallization of the conductive resin and preventing degradation in an electrical characteristic occurring due to thermosetting.

Also, the multilayer ceramic capacitor of the present invention may uniformly harden conductive resin through an irradiation cross-linking method, thereby preventing the appearance of an external electrode from being faulty due to foreign substance generated during a hardening process and enhancing reliability or productivity of the multilayer ceramic capacitor. Also, the multilayer ceramic capacitor may prevent an insulating interface and phase from occurring between conductive resin of a second conductive layer and a metal electrode constituting a first conductive layer, a third conductive layer, and a fourth conductive layer in high temperature heat treatment for solder melting when mounting the multilayer ceramic capacitor to a printed circuit board (not shown), thereby providing high reliability.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A multilayer ceramic capacitor, comprising:
a multilayer ceramic plastic body formed so that a plurality of internal electrode layers intersects; and
a plurality of external electrodes, each formed to cover one side or another side of the multilayer ceramic plastic body and connected to the plurality of internal electrode layers,
wherein each of the plurality of external electrodes includes a plurality of conductive layers that is sequentially formed to cover one side or another side of the multilayer ceramic plastic body, and one of the plurality of conductive layers is formed of conductive resin hardened through an irradiation cross-linking method using gamma ray, and
wherein a material of the conductive resin includes a conductive agent of 70 wt % to 90 wt %, resin of 9 wt % to 27 wt %, an irradiation cross-linking agent of 0.3 wt % to 1 wt %, and a metal chain agent of 1 wt % to 3 wt %.

2. The multilayer ceramic capacitor of claim 1, wherein the plurality of conductive layers comprises:
a first conductive layer formed to cover a circumferential surface and a cross section of the one side or the other side of the multilayer ceramic plastic body and connected to the plurality of internal electrode layers:
a second conductive layer disposed on the first conductive layer to cover the first conductive layer;
a third conductive layer disposed on the second conductive layer to cover the second conductive layer; and
a fourth conductive layer disposed on the third conductive layer to cover the third conductive layer, and
the second conductive layer is formed of conductive resin hardened through the irradiation cross-linking method using gamma ray.

3. The multilayer ceramic capacitor of claim 2, wherein the first conductive layer is formed on the cross section of the one side or the other side of the multilayer ceramic plastic body, the second conductive layer is formed on the edge of the first conductive layer and the circumferential surface of the one side or the other side of the multilayer ceramic plastic body, and the third conductive layer is formed to cover the first conductive layer and the second conductive layer.

4. The multilayer ceramic capacitor of claim 2, wherein between the second conductive layer and the third conductive layer, the second conductive layer is formed along a circumferential surface of the first conductive layer, and the third conductive layer is formed to cover the first conductive layer and the second conductive layer.

5. The multilayer ceramic capacitor of claim 2, wherein one of Ag, Ag—Pt, Cu, Ni, and Sn is used for a material of each of the first conductive layer, the third conductive layer, and the fourth conductive layer.

6. The multilayer ceramic capacitor of claim 1, wherein the irradiation cross-linking method uses gamma ray that is irradiated at 10 Mrad to 20 Mrad.

7. The multilayer ceramic capacitor of claim 1, wherein one of or a mixture of at least one of Cu, Ni, Sn, Ag, and Al is used for the conductive agent.

8. The multilayer ceramic capacitor of claim 1, wherein one of or a mixture of at least two of epoxy, polyimide, polytetrafluoroethylene (PTFE), and phenol is used for the resin.

9. The multilayer ceramic capacitor of claim 1, wherein one of polyethylene terephthalate (PET) and poly sulfone (PSF) is used for the irradiation cross-linking agent.

10. The multilayer ceramic capacitor of claim 1, wherein one of carbon nano tube and carbon black is used for the metal chain agent.

* * * * *